(12) United States Patent
Kim et al.

(10) Patent No.: US 10,037,151 B2
(45) Date of Patent: Jul. 31, 2018

(54) DATA STORAGE DEVICE PERFORMING PATTERN IDENTIFICATION OPERATION, OPERATING METHOD THEREOF, AND DATA PROCESSING SYSTEM INCLUDING THE SAME

(71) Applicant: SK hynix Inc., Gyeonggi-do (KR)

(72) Inventors: Do Hyun Kim, Gyeonggi-do (KR); Dae Hong Kim, Gyeonggi-do (KR); Soong Sun Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 50 days.

(21) Appl. No.: 15/233,760

(22) Filed: Aug. 10, 2016

(65) Prior Publication Data
US 2017/0277445 A1    Sep. 28, 2017

(30) Foreign Application Priority Data
Mar. 25, 2016    (KR) .................. 10-2016-0036149

(51) Int. Cl.
*G06F 12/00*    (2006.01)
*G06F 3/06*    (2006.01)

(52) U.S. Cl.
CPC .......... *G06F 3/0613* (2013.01); *G06F 3/0653* (2013.01); *G06F 3/0679* (2013.01)

(58) Field of Classification Search
CPC ..... G06F 3/0613; G06F 3/0653; G06F 3/0679
See application file for complete search history.

(56) References Cited

U.S. PATENT DOCUMENTS

| 5,903,454 A * | 5/1999 | Hoffberg ............... G06F 3/0482 382/155 |
| 7,203,382 B2 * | 4/2007 | Mattausch ......... G06K 9/00986 365/230.01 |
| 7,561,743 B2 * | 7/2009 | Mattausch ......... G06K 9/00986 382/209 |
| 7,657,706 B2 * | 2/2010 | Iyer ..................... G06F 12/0223 711/109 |
| 7,849,275 B2 * | 12/2010 | Danilak ............... G06F 11/008 711/154 |
| 8,949,483 B1 * | 2/2015 | Martin ................. G06F 3/0653 710/15 |
| 2005/0188155 A1 * | 8/2005 | Schubert ............ G06F 12/0804 711/122 |
| 2008/0288436 A1 * | 11/2008 | Priya N V ......... G06F 12/0246 706/48 |
| 2009/0123062 A1 * | 5/2009 | Komori ............. G06K 9/00711 382/159 |
| 2012/0209893 A1 * | 8/2012 | Kim ................. G06F 17/30129 707/822 |

(Continued)

FOREIGN PATENT DOCUMENTS

KR    1020150049772    5/2015

*Primary Examiner* — David Yi
*Assistant Examiner* — Francisco A Grullon
(74) *Attorney, Agent, or Firm* — IP & T Group LLP

(57) ABSTRACT

A data storage device includes a nonvolatile memory device including first and second memory regions; and a controller suitable for performing a pattern identification operation for write requests, based on a pattern information for one or more patterns, and storing data corresponding to the write requests in one of the first and second memory regions according to a result of the pattern identification operation.

18 Claims, 9 Drawing Sheets

(56) References Cited

U.S. PATENT DOCUMENTS

| | | | |
|---|---|---|---|
| 2014/0052907 A1* | 2/2014 | Starr | G06F 3/0613 |
| | | | 711/111 |
| 2015/0120991 A1* | 4/2015 | Lee | G06F 3/0679 |
| | | | 711/103 |
| 2015/0178193 A1* | 6/2015 | Song | G11C 16/349 |
| | | | 711/103 |
| 2015/0347028 A1* | 12/2015 | Kotte | G06F 3/0611 |
| | | | 711/154 |
| 2017/0277473 A1* | 9/2017 | Shin | G06F 3/0619 |

* cited by examiner

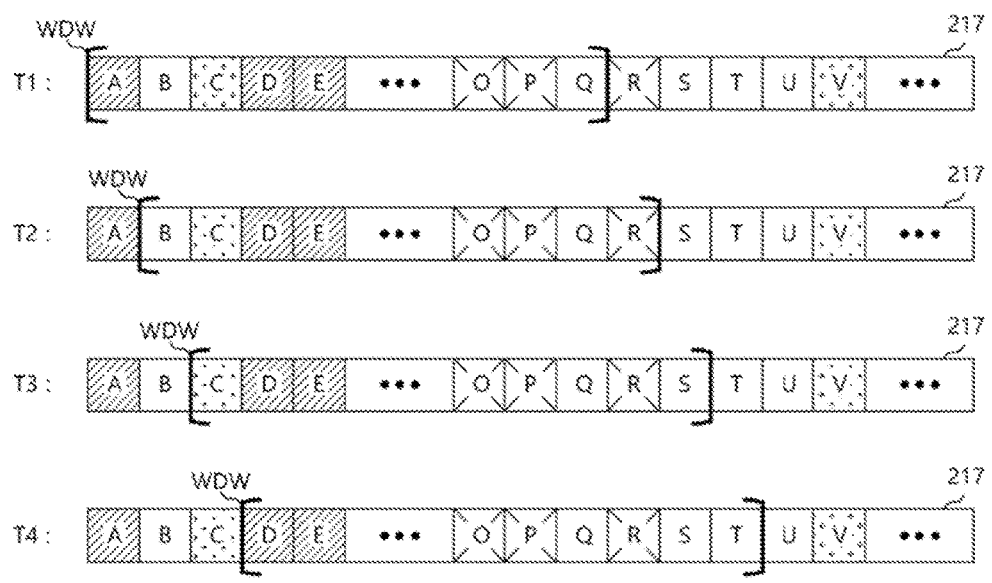

US 10,037,151 B2

DATA STORAGE DEVICE PERFORMING PATTERN IDENTIFICATION OPERATION, OPERATING METHOD THEREOF, AND DATA PROCESSING SYSTEM INCLUDING THE SAME

CROSS-REFERENCES TO RELATED APPLICATION

The present application claims priority under 35 U.S.C. § 119(a) to Korean application number 10-2016-0036149, filed on Mar. 25, 2016, in the Korean Intellectual Property Office, which is incorporated herein by reference in its entirety.

BACKGROUND

1. Technical Field

Various embodiments generally relate to a data storage device and, more particularly, to a data storage device including a nonvolatile memory device.

2. Related Art

Data storage devices store data provided by an external device in response to a write request. Data storage devices may also provide stored data to an external device in response to a read request. Examples of external devices that employ data storage devices include computers, digital cameras, cellular phones and the like. Data storage devices can be embedded in external devices or fabricated separately and then connected afterwards.

SUMMARY

In an embodiment, a data storage device may include: a nonvolatile memory device including first and second memory regions; and a controller suitable for performing a pattern identification operation for write requests, based on a pattern information for one or more patterns, and storing data corresponding to the write requests in one of the first and second memory regions according to a result of the pattern identification operation.

In an embodiment, a method for operating a data storage device may include: receiving write requests; performing a pattern identification operation for the write requests, based on pattern information for one or more patterns; and determining one of first and second memory regions to store data corresponding to the write requests according to a result of the pattern identification operation.

In an embodiment, a data processing system may include: a host device suitable for analyzing one or more patterns existing in sample write requests, and generating pattern information for the patterns, and generate pattern information for the patterns; and a data storage device including a nonvolatile memory device which includes first and second memory regions, and a controller, wherein the controller performs a pattern identification operation for write requests transmitted from the host device, based on the pattern information, and stores data corresponding to the write requests in one of the first and second memory regions according to a result of the pattern identification operation.

BRIEF DESCRIPTION OF THE DRAWINGS

FIG. 3 is a diagram illustrating an example of a pattern table shown in FIG. 1.

FIG. 4 is a diagram illustrating a pattern identification operation of the pattern identification unit of FIG. 1, according to an embodiment of the invention.

DETAILED DESCRIPTION

Figure 1:
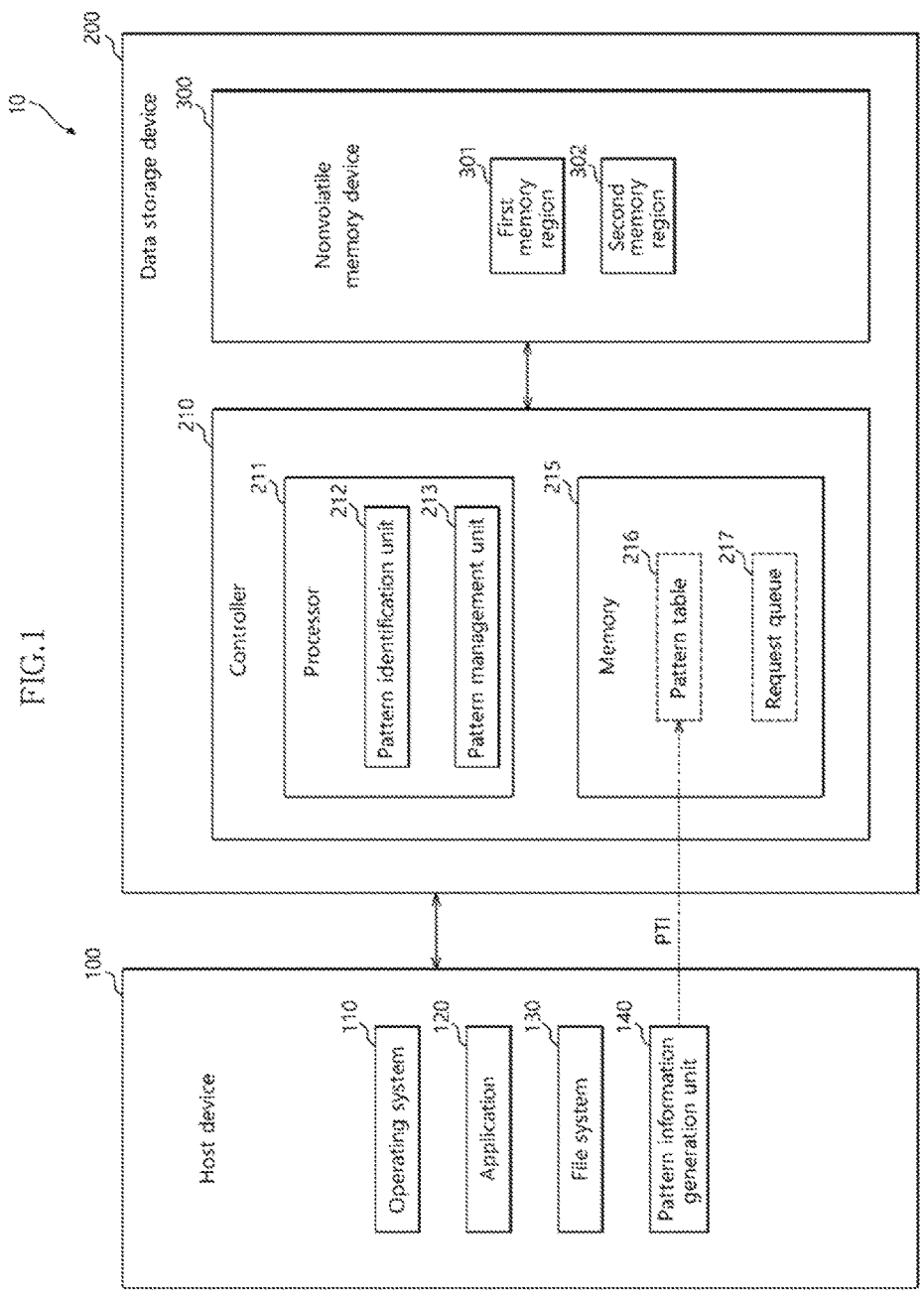
FIG. 1 is a block diagram illustrating a data storage device coupled to a host device, according to an embodiment of the present invention.

Hereinafter, various embodiments of a data storage device and an operating method thereof, will be described with reference to the accompanying drawings. The present invention may, however, be embodied in different forms and should not be construed as being limited to the embodiments set forth herein. Rather, these embodiments are provided for describing the present invention in sufficient detail to enable a person skilled in the art to which this invention pertains to make and practice the invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

Referring now to FIG. 1 a data processing system 10 is provided, according to an embodiment of the present invention.

The data processing system 10 may include a computer, a laptop, a netbook, a smart phone a digital television (TV) a digital camera, a navigation system, and the like. The data processing system 10 may include a host device 100 and the data storage device 200 operatively coupled to each other.

The host device 100 may process data and store processed data in the data storage device 200. The host device 100 may include an operating system 110, an application 120, a file system 130, and a pattern information generation unit 140.

The operating system 110 may control the operations of the host device 100 and manage the internal units of the host device 100.

The application 120 may be configured to perform a specified operation according to input from a user. The application 120 may be a program set which is configured to perform a specified operation.

The file system 130 may structure and manage data which may be used in the host device 100. The file system 130 may structure and manage data which may be used in the data storage device 200.

Meanwhile, the operating system 110, the application 120 and the file system 130 may generate write requests for storing data in the data storage device 200. One or more patterns may exist in the write requests. For example, when write requests for certain data and log data of the certain data are frequently generated together, the write requests may be associated with one another and construct one pattern. For example, write requests which form a pattern may be, generated together simultaneously, or successively, for example, within a somewhat short time.

The write requests which form a pattern may be requests which are generated sufficiently frequently to form a pattern. This is because it is more difficult for infrequent write requests to be analyzed as a pattern. Hence, data corresponding to write requests which form a pattern may be hot data with a high probability that will be accessed within a period of time.

The pattern information generation unit 140 may analyze one or more patterns existing in write requests for the data storage device 200 and generate pattern information PTI for the analyzed patterns. The pattern information PTI generated by the pattern information generation unit 140 may be transmitted to the data storage device 200. As will be described later, the data storage device 200 may perform a pattern identification operation for write requests, based on the pattern information PTI.

The data storage device 200 may be configured to store data provided from the host device 100 in response to a write request from the host device 100. Also, the data storage device 200 may be configured to provide stored data to the host device 100 in response to a read request from the host device 100.

The data storage device 200 may be configured by a Personal Computer Memory Card International Association (PCMCIA) card, a Compact Flash (CF) card, a smart media card, a memory stick, various multimedia cards (e.g., MMC, eMMC, RS-MMC, and MMC-Micro), various secure digital cards (e.g., SD, Mini-SD, and Micro-SD), a Universal Flash Storage (UFS), a Solid State Drive (SSD) and the like.

The data storage device 200 may include a controller 210 and a nonvolatile memory device 300.

The controller 210 may include a processor 211 and a memory 215.

The processor 211 may control the operations of the data storage device 200. For example, the processor 211 may store data in the nonvolatile memory device 300 in response to a write request received from the host device 100. Also, as an example, the processor 211 may read data stored in the nonvolatile memory device 300 and output the read data to the host device 100 in response to a read request received from the host device 100.

The processor 211 may include a pattern identification unit 212 and a pattern management unit 213.

The pattern identification unit 212 may perform a pattern identification operation for write requests received from the host based on a pattern information PTI. The patent information PTI may be stored in a pattern table 216 of the memory 215. The write requests may be stored in a request queue 217 of the memory 215. The pattern identification unit 212 may perform the pattern identification operation for target write requests positioned in a predetermined window in the request queue 217. The pattern identification unit 212 may perform the pattern identification operation by determining whether one or more respective predetermined patterns exist in the target write requests, based on the pattern information PTI.

The pattern management unit 213 may determine a memory region in the nonvolatile memory device 300 for storing data corresponding to a write request, according to a result of the pattern identification operation by the pattern identification unit 212. For example, the pattern management unit 213 may select a first or a second memory region 301, 302 in the nonvolatile memory device 300, as a region for storing the write request data of the target write requests, based, for example, on whether the target write requests are identified as conforming to a pattern and whether the pattern has a high or low priority.

At a predetermined time or when a predetermined condition is satisfied, the processor 211 may perform a memory management operation for moving data from the first memory region 301 to the second memory region 302.

The memory 215 may serve as a working memory, a buffer memory or a cache memory of the processor 211. The memory 215 as a working memory may store software programs and various program data to be driven by the processor 211. The memory 215 as a buffer memory may buffer data transmitted between the host device 100 and a storage medium, such as, for example, the nonvolatile memory device 300. The memory 215 as a cache memory may temporarily store cache data.

The memory 215 may store the pattern table 216 and the request queue 217.

The pattern table 216 may include pattern information PTI of respective patterns which may exist in write requests. The pattern table 216 may be received from the host device 100. For example, the pattern table 216 may be received from the host device 100, when the controller 210 is coupled with the host device 100, when the controller 210 is booted and/or when update of the pattern table 216 is required. Alternatively, the pattern table 216 may be received from the host device 100 and stored in the nonvolatile memory device 300, and may be read to the controller 210 from the nonvolatile memory device 300 when the controller 210 is booted and/or in case of need.

The request queue 217 may store write requests received from the host device 100 to be processed for the nonvolatile memory device 300.

The nonvolatile memory device 300 may include the first memory region 301 and the second memory region 302. The nonvolatile memory device 300 may store data received from the controller 210, in the first memory region 301 or the second memory region 302, and may read out stored data and transmit read-out data to the controller 210, according to control of the controller 210.

The nonvolatile memory device 300 may access the first and second memory regions 301 and 302 at different speeds. For example, the nonvolatile memory device 300 may access the first memory region 301 at a first speed and access the second memory region 302 at a second speed, wherein the second speed is slower than the first speed. For example, the first memory region 301 may include memory cells suitable for storing a smaller number of bits, than the second memory region 302.

The nonvolatile memory device 300 may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is illustrated in FIG. 1 that the data storage device 200 includes one nonvolatile memory device 300, it is to be noted that the embodiment is not limited to such.

In operation, according to an embodiment, the host device 100 may generate pattern information PTI for a plurality of write requests with respect to the data storage device 200 and provide the pattern information PTI to the data storage device 200. The data storage device 200 may identify a pattern in the plurality of write requests based on the pattern information PTI and store data corresponding to write requests identified as a pattern (i.e., data identified as a pattern) in a memory region which may be accessed quickly, whereby operational performance of the data processing system 10 may be improved.

Figure 2:
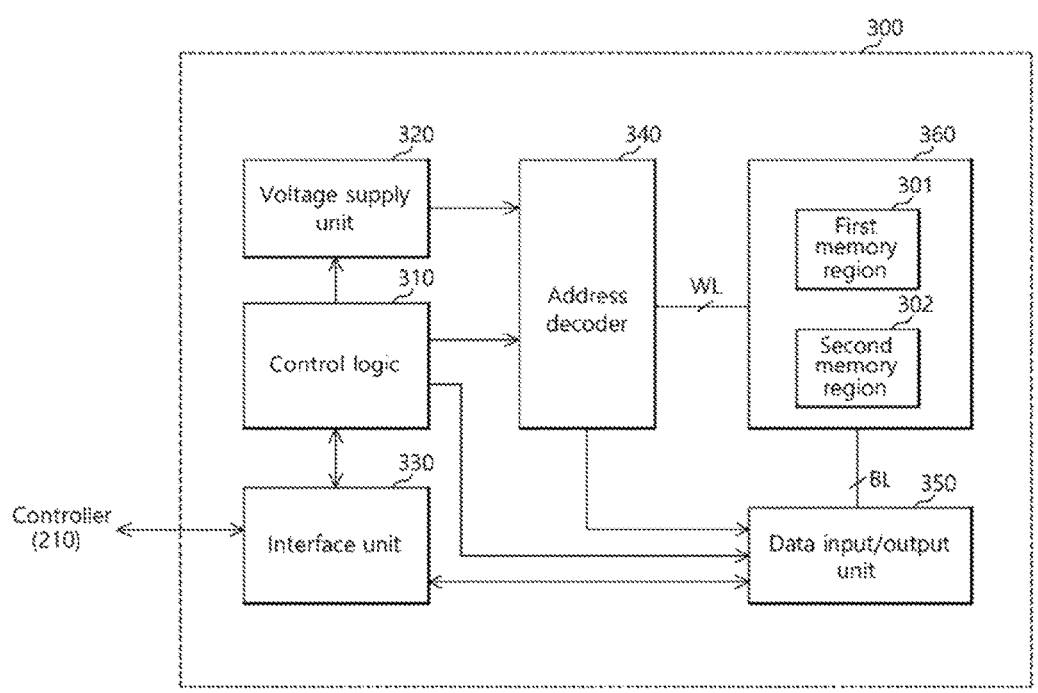
FIG. 2 is a block diagram illustrating a configuration for a nonvolatile memory device employed in the storage device of FIG. 1.

FIG. 2 illustrates a configuration for the nonvolatile memory device 300 shown in FIG. 1.

Referring to FIG. 2, the nonvolatile memory device 300 may include a control logic 310, a voltage supply unit 320, an interface unit 330, an address decoder 340, a data input/output unit 350, and a memory region 360.

The control logic 310 may control the operations of the nonvolatile memory device 300 according to control of the controller 210. For example, the control logic 310 may receive a command from the controller 210, through the interface unit 330, and may transmit control signals to internal units of the nonvolatile memory device 300 in response to the command.

The voltage supply unit 320 may generate various operation voltages necessary for performing the operations of the nonvolatile memory device 300, according to control of the control logic 310. For example, the voltage supply unit 320 may supply various voltages to be used in at least one of a write and read operations, to the address decoder 340.

The interface unit 330 may exchange various control signals such as commands, and addresses and also data with the controller 210. The interface unit 330 may transmit various control signals and data inputted thereto, to the internal units of the nonvolatile memory device 300.

The address decoder 340 may decode addresses to select corresponding portions to be accessed in the memory region 360. The address decoder 340 may selectively drive word lines WL and control the data input/output unit 350 to selectively drive bit lines BL, according to the decoding results.

The data input/output unit 350 may transmit data 'received' from the interface unit 330, to the memory region 360 through the bit lines BL. The data input/output unit 350 may transmit data read out from the memory region 360 through the bit lines BL, to the interface unit 330. The data input/output unit 350 may sense current formed as memory cells included in the memory region 360 are turned on and off in response to a read voltage, and may obtain data read from the memory cells, according to the sensing results.

The memory region 360 may be coupled with the address decoder 340 through the word lines WL, and may be coupled with the data input/output unit 350 through the bit lines BL. The memory region 360 may include a plurality of memory cells which are respectively disposed at areas where the word lines WL and the bit lines BL intersect with each other and in which data are stored. The memory region 360 may include a memory cell array of a two-dimensional or three-dimensional structure. The memory region 360 may include the first memory region 301 and the second memory region 302.

FIG. 3 is a diagram illustrating an example of the pattern table 216 of FIG. 1.

Referring to FIG. 3, the pattern table 216 may include pattern information PTI for a plurality of patterns PT1 to PTx. Each pattern information PTI may include an identification information to be used in identifying a predetermined pattern in write requests. The identification information may, for example, include addresses, and/or data sizes of write requests associated with a predetermined pattern. In the illustrated example of FIG. 3, an identification information for the pattern PT1 may include addresses ADDR1 to ADDR3 of write requests corresponding to the pattern PT1.

A plurality of patterns associated with a single write request may exist, and accordingly, for example, respective identification information of the two patterns PT1 and PT2 may include the same address ADDR1.

The numbers of write requests associated with each of the respective patterns PT1 to PTx may vary.

As described above, data identified as a pattern may have a high access frequency when compared to data not identified as a pattern. In addition, among the patterns PT1 to PTx, patterns having high generation frequencies may be distinguished from patterns not having high generation frequencies and may be afforded with high priorities.

According to an embodiment, the pattern information PTI may include priority information for priorities of the respective patterns PT1 to PTx. For example, as shown in FIG. 3, the pattern PT1 may have a high priority, and the pattern PT2 may have a low priority. According to another embodiment, the priority information may include more than two grades of priorities, e.g., priority information may be afforded by grades subdivided further to more than two grades including high and low. As will be described later, priority information may be used in selecting a memory region for storing data identified as a particular pattern. Also, the priority information may be used in selecting data to be moved to the second memory region 302 in the memory management operation for the first memory region 301.

FIG. 4 illustrates a pattern identification operation performed by the pattern identification unit 212 of FIG. 1, according to an embodiment of the invention.

The pattern identification operation may be performed for a plurality of target write requests positioned in a predetermined window WDW in the request queue 217. The pattern identification operation may be performed by determining whether some of the target write requests positioned in the window WDW are identified as a pattern, based on the pattern table 216. In other words, the pattern identification operation may be performed by determining whether respective patterns exist in the target write requests, based on the pattern table 216.

The window WDW may be used to limit the write requests for identifying a pattern, to the target write requests, in the request queue 217. Write requests received from the host device 100 may be inserted, out of order, into the request queue 217, and therefore, a pattern may be identified for the target write requests limited by the window WDW in the request queue 217. If the window WDW is set too narrow, an actual pattern existing in the write requests inserted out of order may not be identified. If the window WDW is set too wide, write requests inserted out of order and not constructing an actual pattern may be erroneously identified as a pattern. Thus, the window WDW may be set to an appropriate size according to performances of the host device 100 and the data storage device 200.

While FIG. 4 illustrates only one window WDW, it is noted that, a plurality of windows may be used. The plurality of windows may be set to have identical or different ranges.

When a pattern identification operation is completed within a current window WDW, the window WDW may be moved in the request queue 217. Namely, the window WDW may be moved in the request queue 217 after determination is made whether or not each one of the patterns in the pattern table 216 exists in the plurality of target write requests positioned in the window WDW. Stated otherwise, the window WDW is moved in the request queue 217 after identification of all possible patterns existing in the target write requests have been completed.

For example, referring to FIG. 4, there is shown the window WDW which is moved each time the pattern identification operation is completed and is set at respective timings T1 to T4.

Referring to FIG. 4, at time T1, write requests A, D and E may be identified as pattern PT1. Likewise write requests O and P form a pattern PT2. We note here that two or more write requests within a window at the same time that have the same pattern information PT1 may form a pattern, for example, PT1, PT2 or PT3. In the example of FIG. 4, as an example, we consider the case wherein at least three write requests must have the same pattern information for being identified as a pattern. When it is determined that all possible patterns existing in the window WDW have been identified, the window WDW may be moved to exclude an initial write request A and include a subsequent write request R.

At time T2, write requests O, P and R may be identified as a pattern PT2. In other words, the write requests O, P and R may be identified as the pattern PT2 for the first time when they are simultaneously positioned in the window WDW.

At time T3, a write request B may be excluded from the window WDW. As illustrated in FIG. 4 the write request B is not associated with any pattern and cannot be identified as being part of any of the patterns PT1, PT2 or PT3.

At time T4, a write request C may be excluded from the window WDW. Even though the write request C is associated with a pattern PT3 together with another write request (e.g., a write request V), because it has not existed in the window WDW together with the write request V, it may not be identified as the pattern PT3.

Figure 5A:
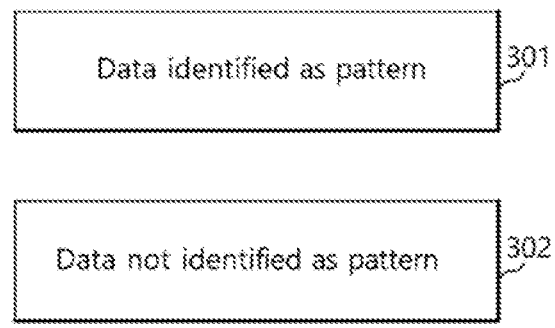
FIGS. 5A and 5B are diagrams illustrating data stored in a first memory region and a second memory region according to results of a pattern identification operation.
Figure 5B:
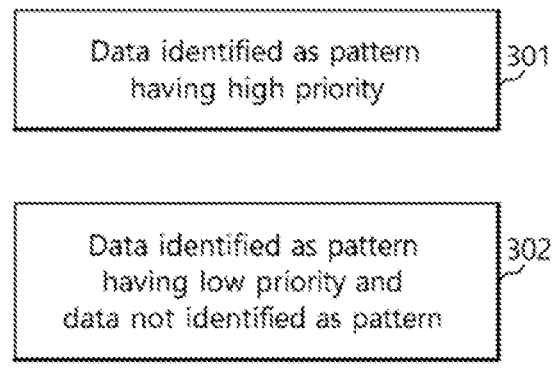

FIGS. 5A and 5B are diagrams illustrating data stored in the first memory region 301 and the second memory region 302 of FIG. 1, according to results of the pattern identification operation.

The pattern management unit 213 of FIG. 1 may determine in which memory region data corresponding to a write request is to be stored, according to a result of the pattern identification operation.

Referring to FIG. 5A, the pattern management unit 213 may determine a memory region to store data, based on whether write requests have been identified as a pattern. Therefore, data corresponding to a write request identified as a pattern (i.e., data identified as a pattern) may be stored in the first memory region 301. Data corresponding to a write request not identified as a pattern (i.e., data not identified as a pattern) may be stored in the second memory region 302.

Referring to FIG. 5B, the pattern management unit 213 may determine a memory region to store data, based on whether write requests have been identified as a pattern and whether the pattern has a high priority. Therefore, data identified as a pattern which has a high priority may be stored in the first memory region 301. Data identified as a pattern which has a low priority and data not identified as a pattern may be stored in the second memory region 302.

Figure 6A:
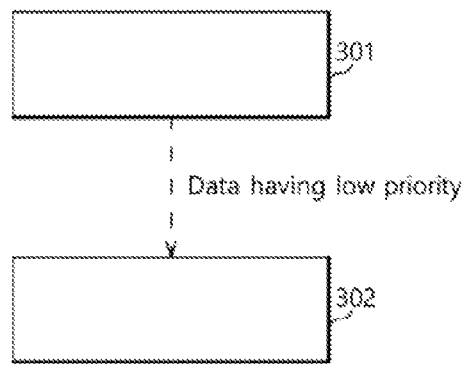
FIGS. 6A to 6C are diagrams illustrating various methods for the controller of FIG. 1 to perform a memory management operation, according to embodiments of the invention.
Figure 6B:
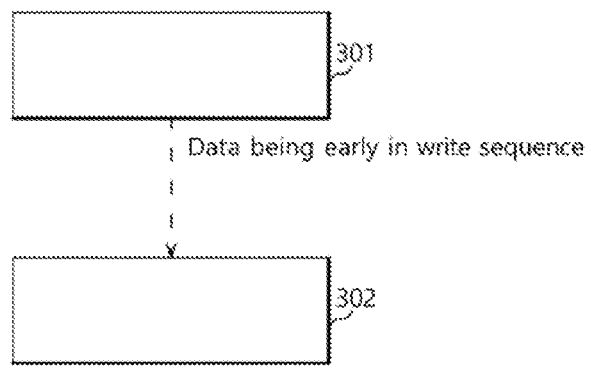
Figure 6C:
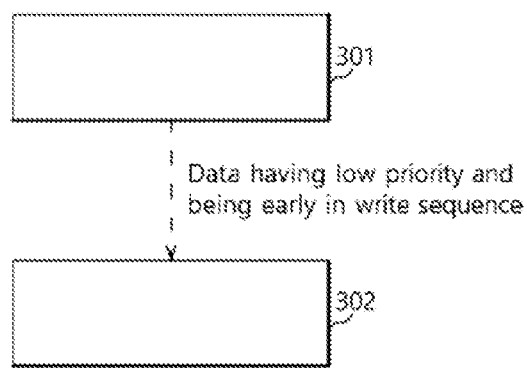

FIGS. 6A to 6C are diagrams illustrating various methods for performing a memory management operation.

The controller 210 may perform a memory management operation to secure an empty region in the first memory region 301. For example, the memory management operation may be performed, when an empty region does not exist in the first memory region 301, when the rate of an empty region with respect to a written region is smaller than a threshold value or at a predetermined time. Through the memory management operation, the controller 210 may move data selected according to a predetermined criterion from the first memory region 301 to the second memory region 302.

Referring to FIG. 6A, when a memory management operation is performed, data having a low priority among data stored in the first memory region 301 may be moved to the second memory region 302.

Referring to FIG. 6B, when the memory management operation is performed, data being entered early in a write sequence (i.e., data stored for a longer period of time), among data stored in the first memory region 301, may be moved to the second memory region 302.

Referring to FIG. 6C, when memory management operation is performed, data having a low priority and being entered early in a write sequence among data stored in the first memory region 301 may be moved to the second memory region 302.

According to an embodiment, the controller 210 may manage a list for data to be selected in the first memory region 301, based on priorities of patterns and a write sequence, for the above-described memory management operation.

Figure 7:
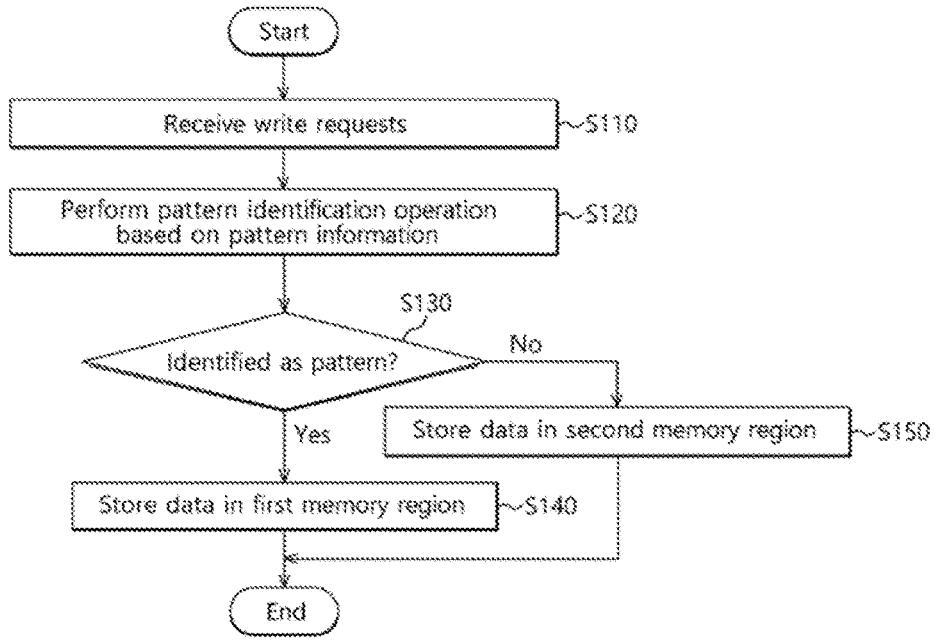
FIG. 7 is a flow chart of a pattern identification operation, according to an embodiment of the invention.

FIG. 7 is a flow chart a pattern identification operation, according to an embodiment of the invention.

At step S110, the controller 210 of FIG. 1 may receive write requests from the host device 100. The received write requests may be stored in the request queue 217.

At step S120, the controller 210 may perform the pattern identification operation for the write requests stored in the request queue 217, based on the pattern information PTI. The controller 210 may perform the pattern identification operation for target write requests positioned in a predetermined window in the request queue 217.

At step S130, the controller 210 may determine whether write requests are identified as a pattern, through the pattern identification operation. In the case where write requests are identified as a pattern, the process may proceed to step S140. In the case where write requests are not identified as a pattern, the process may proceed to step S150.

At step S140, the controller 210 may store data corresponding to write requests identified as a pattern, in the first memory region 301 of the nonvolatile memory device 300.

At step S150, the controller 210 may store data corresponding to write requests not identified as a pattern, in the second memory region 302 of the nonvolatile memory device 300.

Hence, by storing data identified as a pattern, in the first memory region 301 capable of being quickly accessed, a more efficient data management is accomplished.

Figure 8:
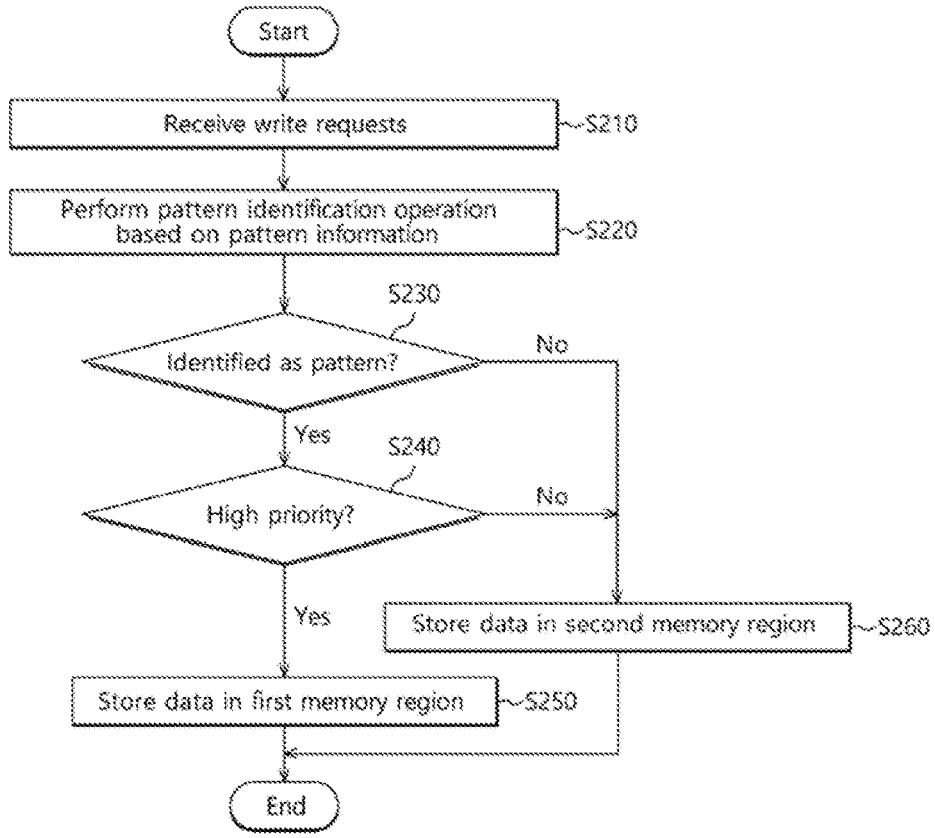
FIG. 8 is a flow chart of a pattern identification operation, according to another embodiment of the invention.

FIG. 8 is a flow chart illustrating a pattern identification operation, according to another embodiment of the invention. The method shown in FIG. 8 may be substantially the same as the method shown in FIG. 7 except that step S240 is additionally included. In other words, steps S210, S220, S230, S250 and S260 in FIG. 8 are corresponding to steps S110, S120, S130, S140 and S150 in FIG. 7, respectively, and the descriptions thereof will thus be omitted.

At step S240, the controller 210 may determine whether a pattern existing in write requests has a high priority, based on priority information. In the case where a pattern has a high priority, the process may proceed to step S250. In the case where a pattern has a low priority, the process may proceed to step S260.

Hence, by storing only data identified as a pattern having a high priority, in the first memory region 301, a more efficient memory use is obtained.

Figure 9:
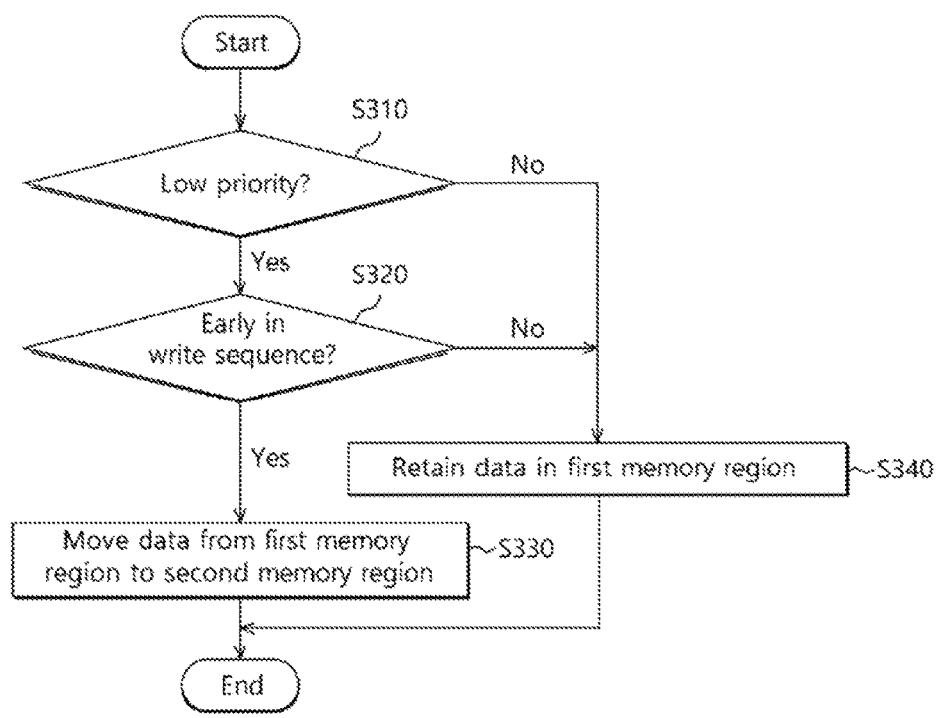
FIG. 9 is a flow chart of a memory management operation, according to an embodiment of the invention.

FIG. 9 is a flow chart of a memory management operation.

At step S310, the controller 210 of FIG. 1 may determine whether data stored in the first memory region 301 has been identified as a pattern having a low priority. In the case where a pattern has a low priority, the process may proceed to step S320. In the case where a pattern has a high priority, the process may proceed to step S340.

At step S320, the controller 210 may determine whether corresponding data is early in a write sequence. In the case where corresponding data is early in a write sequence, the process may proceed to step S330. In the case where the corresponding data is not early in the write sequence, the process may proceed to the step S340.

At step S330, the controller 210 may move the corresponding data from the first memory region 301 to the second memory region 302.

At step S340, the controller 210 may retain the corresponding data in the first memory region 301.

Figure 10:
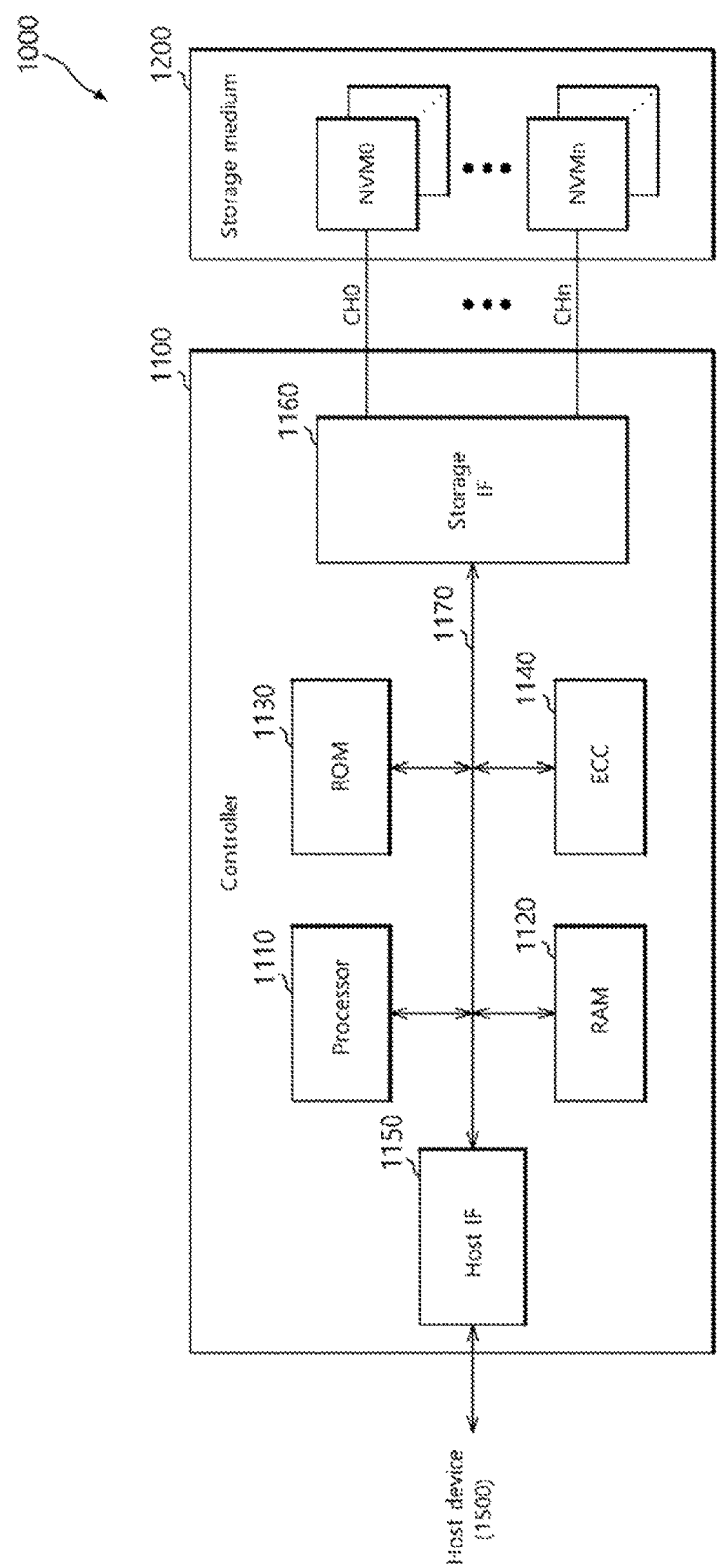
FIG. 10 is a block diagram illustrating a solid state drive (SSD) according to an embodiment.

FIG. 10 is a block diagram illustrating a solid state drive (SSD) 1000, according to an embodiment of the invention.

Referring to FIG. 10, the SSD 1000 may include a controller 1100 and a storage medium 1200.

The controller 1100 may control data exchange between a host device 1500 and the storage medium 1200. The controller 1100 may include a processor 1110, a random access memory (RAM) 1120, a read only memory (ROM) 1130, an error correction code (ECC) unit 1140, a host interface 1150, and a storage medium interface 1160.

The controller 1100 may operate substantially similarly to the controller 210 shown in FIG. 1.

The processor 1110 may control the operations of the controller 1100. The processor 1110 may store data in the storage medium 1200 and read stored data from the storage medium 1200, according to data processing requests from the host device 1500. In order to efficiently manage the storage medium 1200, the processor 1110 may control the internal operations of the SSD 1000, such as a merge operation, a wear leveling operation, and so forth.

Also, the processor 1110 may operate in a manner substantially similar to the processor 211 shown in FIG. 1. The processor 1110 may perform a pattern identification operation for write requests. The processor 1110 may perform the pattern identification operation for write requests, based on pattern information received from the host device 1500. The processor 1110 may perform the pattern identification operation for target write requests positioned in a predetermined window in a request queue. The processor 1110 may determine a memory region to store data corresponding to a write request, in a nonvolatile memory device of the storage medium 1200, according to a result of the pattern identification operation. The processor 1110 may determine a memory region to store data, based on whether write requests are identified as a pattern and/or whether a pattern has a high priority. As a result, the processor 1110 may store data identified as a pattern, in a memory region of the nonvolatile memory device which may be accessed quickly.

The RAM 1120 may store programs and program data to be used by the processor 1110. The RAM 1120 may temporarily store data received from the host interface 1150 before transferring it to the storage medium 1200, and may temporarily store data from the storage medium 1200 before transferring it to the host device 1500.

The ROM 1130 may store program codes to be read by the processor 1110. The program codes may include commands to be processed by the processor 1110, for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface 1150 may exchange data processing requests, data, and the like with the host device 1500.

The storage medium interface 1160 may transmit control signals and data to the storage medium 1200. The storage medium interface 1160 may receive data from the storage medium 1200. The storage medium interface 1160 may be coupled with the storage medium 1200 through a plurality of channels CH0 to CHn.

The storage medium 1200 may include a plurality of nonvolatile memory devices NVM0 to NVMn. Each of the plurality of nonvolatile memory devices NVM0 to NVMn may perform a write operation and a read operation according to control of the controller 1100.

Figure 11:
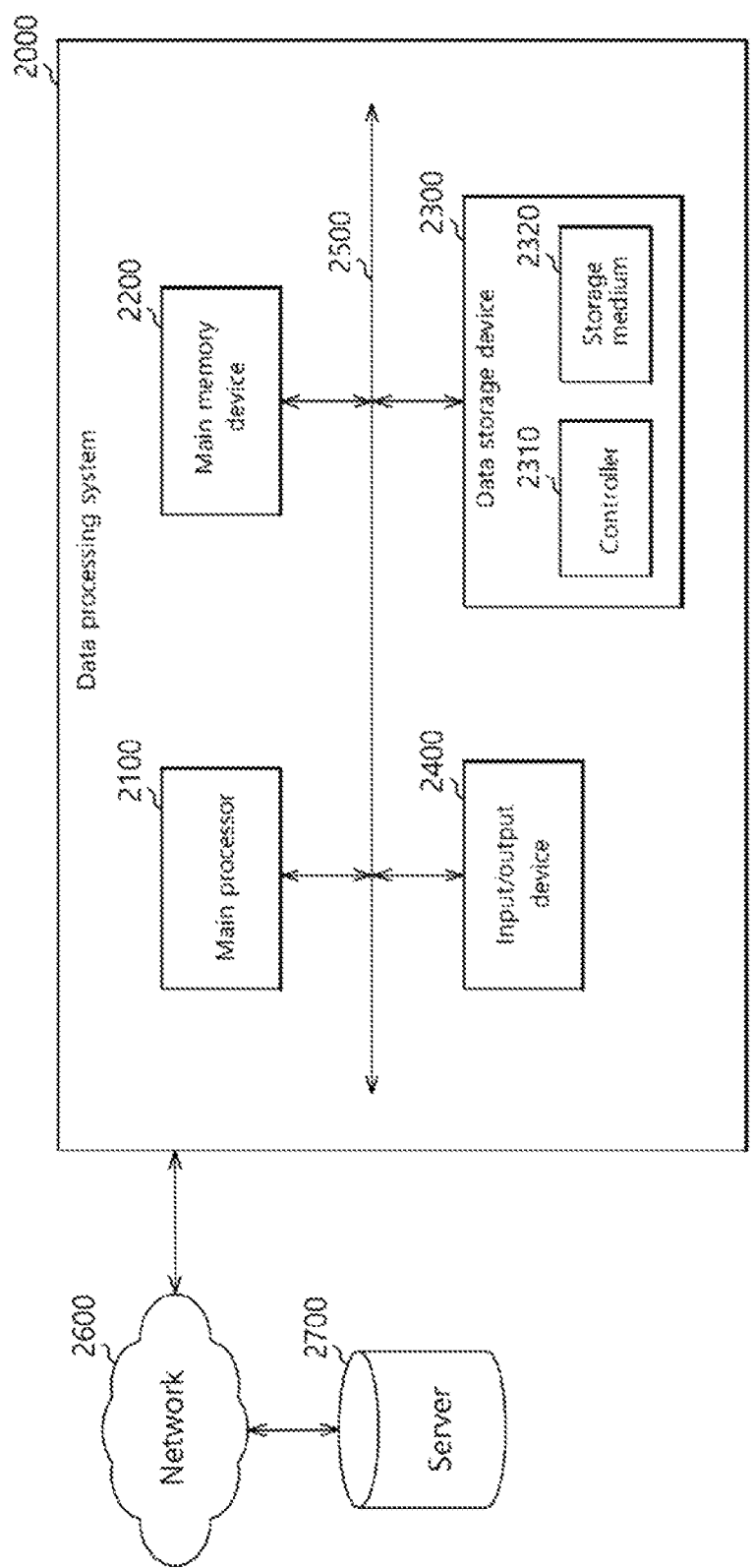
FIG. 11 is a block diagram illustrating a data processing system including a data storage device, according to an embodiment of the present invention.

FIG. 11 is a block diagram illustrating a data processing system 2000, according to an embodiment of the invention.

Referring to FIG. 11, the data processing system 2000 may include a main processor 2100, a main memory device 2200, a data storage device 2300, and an input/output device 2400. The internal units of the data processing system 2000 may exchange data, control signals, and the like through a system bus 2500.

The main processor 2100 may control the operations of the data processing system 2000. The main processor 2100 may be a central processing unit such as a microprocessor. The main processor 2100 may execute software, such as an operation system, an application, a device driver, and so forth, on the main memory device 2200.

The main processor 2100 may include the pattern information generation unit 140 of FIG. 1. That is to say, the main processor 2100 may analyze one or more patterns existing in write requests for the data storage device 2300, generate pattern information for the analyzed patterns, and transmit the generated pattern information to the data storage device 2300.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate in a manner substantially similar to the data storage device 200 shown in FIG. 1.

The input/output device 2400 may include at least one of a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a local area network (LAN), a wide area network (WAN), a wireless network, and so on. The data processing system 2000 may include a network interface (not shown) to access the network 2600.

While various embodiments have been described above, it will be understood to those skilled in the art that the embodiments described are examples only. Accordingly the data storage device, the operating method thereof, and the data processing system including the same described herein should not be limited based on the described embodiments. Various other embodiments and variations thereof may be envisaged by those skilled in the art to which this invention pertains without departing from the spirit and or scope of the invention as defined by the following claims.

What is claimed is:

1. A data storage device comprising:
a nonvolatile memory device including first and second memory regions; and
a controller suitable for storing write requests received from a host device, in a request queue, performing a pattern identification operation by identifying one or more patterns only in a predetermined window in the request queue, based on a pattern information for one or more patterns, and storing data corresponding to the write requests in one of the first and second memory regions according to a result of the pattern identification operation, each of the patterns being composed of two or more write requests.

2. The data storage device according to claim 1, wherein the controller performs the pattern identification operation by determining whether the respective patterns exist in the window.

3. The data storage device according to claim 1, wherein the controller repeats the pattern identification operation by moving the window in the request queue,
wherein the window and a moved window are partially overlapped.

4. The data storage device according to claim 1, wherein the controller stores data corresponding to write requests identified as any one of the patterns, in the first memory region and write requests not identified as any one of the patterns, in the second memory region.

5. The data storage device according to claim 1, wherein the controller stores data corresponding to write requests identified as any one of the patterns, in the second memory region, the any one of the patterns having a low priority based on priority information.

6. The data storage device according to claim 1, wherein the controller moves data stored in the first memory region to the second memory region, based on a priority information and a write sequence.

7. The data storage device according to claim 1,
wherein each of the patterns corresponds to write requests associated based on a generation pattern, and
wherein a pattern information of each of the patterns comprises at least one of addresses and data sizes corresponding to the write requests associated.

8. The data storage device according to claim 1, wherein the nonvolatile memory device accesses the first memory region at a first speed and accesses the second memory region at a second speed less than the first speed.

9. A data processing system comprising:
a host device suitable for analyzing one or more patterns existing in sample write requests, and generating pattern information for the patterns; and
a data storage device including a nonvolatile memory device which includes first and second memory regions, and a controller,
wherein the controller stores write requests received from a host device, in a request queue, performs a pattern identification operation by identifying one or more patterns only in a predetermined window in the request queue, based on the pattern information, and stores data corresponding to the write requests in one of the first and second memory regions according to a result of the pattern identification operation and each of the patterns being composed of two or more write requests.

10. The data processing system according to claim 9, wherein the controller performs the pattern identification operation by determining whether the respective patterns exist in the window.

11. The data processing system according to claim 9, wherein the controller repeats the pattern identification operation by moving the window in the request queue,
wherein the window and a moved window are partially overlapped.

12. The data processing system according to claim 9, wherein the controller stores data corresponding to write requests identified as any one of the patterns, in the first memory region.

13. The data processing system according to claim 9, wherein the controller stores data corresponding to write requests not identified as even any one of the patterns, in the second memory region.

14. The data processing system according to claim 9, wherein the controller stores data corresponding to write requests identified as any one of the patterns, in the second memory region, the any one of the patterns having a low priority based on priority information.

15. The data processing system according to claim 9, wherein the controller moves data stored in the first memory region to the second memory region, based on a priority information and a write sequence.

16. The data processing system according to claim 9,
wherein each of the patterns corresponds to write requests associated based on a generation pattern, and
wherein a pattern information of each of the patterns comprises at least one of addresses and data sizes corresponding to the write requests associated.

17. The data processing system according to claim 9, wherein the controller receives the pattern information from the host device.

18. The data processing system according to claim 9, wherein the nonvolatile memory device accesses the first memory region at a first speed and accesses the second memory region at a second speed less than the first speed.

* * * * *